US012614164B2

(12) United States Patent
Yang et al.

(10) Patent No.: US 12,614,164 B2
(45) Date of Patent: Apr. 28, 2026

(54) DATA INPUT METHOD, DEVICE, DUAL-CHIP POINT-OF-SALE TERMINAL, AND STORAGE MEDIUM

(71) Applicant: SHENZHEN PAX SMART NEW TECHNOLOGY CO., LTD., Shenzhen (CN)

(72) Inventors: Chenghe Yang, Shenzhen (CN); Duxu Ding, Shenzhen (CN)

(73) Assignee: SHENZHEN PAX SMART NEW TECHNOLOGY CO., LTD., Shenzhen (CN)

( * ) Notice: Subject to any disclaimer, the term of this patent is extended or adjusted under 35 U.S.C. 154(b) by 33 days.

(21) Appl. No.: 18/725,555

(22) PCT Filed: Oct. 18, 2022

(86) PCT No.: PCT/CN2022/125968
§ 371 (c)(1),
(2) Date: Jun. 28, 2024

(87) PCT Pub. No.: WO2023/124419
PCT Pub. Date: Jul. 6, 2023

(65) Prior Publication Data
US 2025/0156831 A1     May 15, 2025

(30) Foreign Application Priority Data

Dec. 28, 2021     (CN) .......................... 202111630871.8

(51) Int. Cl.
*G06Q 20/20*          (2012.01)
*G06F 3/04886*        (2022.01)

(52) U.S. Cl.
CPC ....... *G06Q 20/206* (2013.01); *G06F 3/04886* (2013.01)

(58) Field of Classification Search
CPC .. G06Q 20/206; G06Q 20/20; G06F 3/04886; G06F 3/0488; G06F 3/041; G06F 3/04883; G07G 1/00; G07G 1/12
(Continued)

(56) References Cited

U.S. PATENT DOCUMENTS

| | | | |
|---|---|---|---|
| 6,850,274 B1 | 2/2005 | Walmsley et al. | |
| 2012/0056816 A1* | 3/2012 | Ettinger | G06F 3/0235 |
| | | | 345/171 |
| 2014/0215365 A1* | 7/2014 | Hiraga | G06F 3/04883 |
| | | | 715/765 |

FOREIGN PATENT DOCUMENTS

| | | |
|---|---|---|
| CN | 102426491 A | 4/2012 |
| CN | 102692743 A | 9/2012 |

(Continued)

OTHER PUBLICATIONS

Paradowski, D. et al. Modularization of mobile shopping assistance systems. 2013 5th International Workshop on Near Field Communication (NFC), 2013. (Year: 2013).*

(Continued)

*Primary Examiner* — Fawaad Haider
(74) *Attorney, Agent, or Firm* — CANTOR COLBURN LLP

(57)          ABSTRACT

A data input method, which is applied to an application chip and includes steps of: entering a secure input mode upon detecting a preset touch event; obtaining target information of a preset double-click event upon detecting the preset double-click event within a preset time period; sending the target information to a security chip and receiving target data corresponding to the target information returned by the security chip; and uploading the target data to an application layer upon detecting that an input is completed. In the present application, touch data detected based on a touch screen is filtered by means of the application chip, and only (Continued)

Entering, upon detecting a preset touch event, a secure input mode ⌐ S101

Obtaining, upon detecting a preset double-click event within a preset time period, target information of the preset double-click event ⌐ S102

Sending the target information to the security chip, and receiving target data corresponding to the target information returned by a security chip ⌐ S103

Uploading, upon detecting that an input is completed, the target data to an application layer ⌐ S104 the detected target information is sent to the security chip for processing, and a multi-touch signal of the touch screen is processed by means of the security chip based on the software logic to determine the input data of the visually impaired user.

8 Claims, 3 Drawing Sheets

(58) Field of Classification Search
USPC .......................................................... 705/18
See application file for complete search history.

(56) References Cited

FOREIGN PATENT DOCUMENTS

| CN | 104156642 | A | | 11/2014 | |
|----|-----------|---|---|---------|---|
| CN | 105164694 | A | | 12/2015 | |
| CN | 106096961 | A | | 11/2016 | |
| CN | 106648416 | A | | 5/2017 | |
| CN | 109891379 | A | | 6/2019 | |
| CN | 110390530 | A | | 10/2019 | |
| CN | 110989451 | A | | 4/2020 | |
| CN | 111580737 | A | * | 8/2020 | .......... G06F 3/0202 |
| CN | 112446063 | A | | 3/2021 | |
| CN | 113177202 | A | | 7/2021 | |
| CN | 113177238 | A | | 7/2021 | |
| CN | 114296625 | A | | 4/2022 | |
| CN | 114489374 | A | | 5/2022 | |

OTHER PUBLICATIONS

International Search Report for International Application No. PCT/CN2022/125968; Mailing Date, Jan. 4, 2023.
Written Opinion for International Application No. PCT/CN2022/125968; Mailing Date, Jan. 4, 2023.

* cited by examiner

Entering, upon detecting a preset touch event, a secure input mode ⟩— S101

Obtaining, upon detecting a preset double-click event within a preset time period, target information of the preset double-click event ⟩— S102

Sending the target information to the security chip, and receiving target data corresponding to the target information returned by a security chip ⟩— S103

Uploading, upon detecting that an input is completed, the target data to an application layer ⟩— S104

FIG. 1

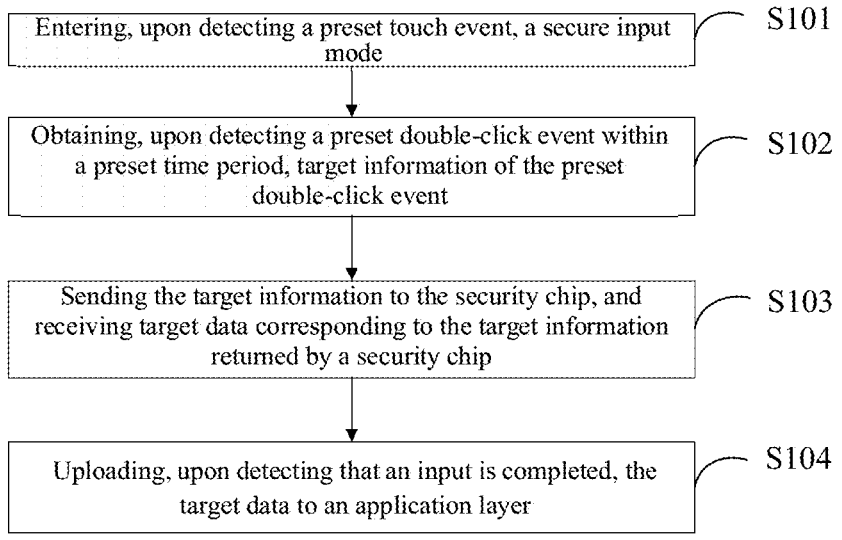

DATA INPUT METHOD, DEVICE, DUAL-CHIP POINT-OF-SALE TERMINAL, AND STORAGE MEDIUM

CROSS-REFERENCE TO RELATED APPLICATIONS

This application is the national phase entry of International Application No. PCT/CN2022/125968, filed on Oct. 18, 2022, which is based upon and claims priority to the Chinese Patent Application No. 202111630871.8, filed on Dec. 28, 2021, the entire contents each of which are incorporated herein by reference.

TECHNICAL FIELD

The present application relates to the field of point-of-sale terminal technology, and in particular, to a data input method, a device, a dual-chip point-of-sale terminal and a readable storage medium.

BACKGROUND

At present, the application field of smart touch-screen point-of-sale (POS) terminals is becoming wider and wider. When using POS terminals for sales and payment operations, there is a need to enter a password.

In related arts, POS devices available to visually impaired users are usually provided with Braille physical components, the visually impaired users are enabled to implement password input operations through the Braille physical components which will result in high device costs. In addition, there is a possibility of mis-input during the user's password input operation, which increases the amount of data processing and reduces the efficiency and accuracy of data input.

SUMMARY

Embodiments of the present application provide a data input method, a device, a dual-chip point-of-sale terminal and a readable storage medium, which can solve the problems of high cost, large calculation amount, and low data input efficiency and accuracy of point-of-sale terminals in the related arts.

In accordance with a first aspect, an embodiment of the present application provides a data input method, which is applied to an application chip, and includes the following steps:

entering, upon detecting a preset touch event, a secure input mode;

obtaining, upon detecting a preset double-click event within a preset time period, target information of the preset double-click event;

sending the target information to a security chip and receiving target data corresponding to the target information returned by the security chip; and uploading, upon detecting that an input is completed, the target data to an application layer.

In accordance with a second aspect, an embodiment of the present application provides a data input method, which is applied to a security chip, and includes the following steps:

receiving position range information of multiple preset input regions sent by an application chip;

assigning each of the preset input regions with corresponding preset data, and establishing an association relationship between the preset input regions and the corresponding preset data to obtain a preset data query table;

determining, upon receiving target information sent by the application chip, target data corresponding to the target information based on the preset data query table; and sending the target data to the application chip.

In accordance with a third aspect, an embodiment of the present application provides a data input device, which is applied to an application chip, and includes: a detection module, an information acquisition module, a first sending module and an upload module.

The detection module is configured to enter a secure input mode when a preset touch event is detected.

The information acquisition module is configured to obtain target information of a preset double-click event when the preset double-click event is detected within a preset time period.

The first sending module is configured to send the target information to a security chip and receive target data corresponding to the target information returned by the security chip.

The upload module is configured to upload the target data to an application layer when an input is detected to be completed.

In accordance with a fourth aspect, an embodiment of the present application provides a data input device, which is applied to a security chip, and includes: a receiving module, an assignment module, a query module and a second sending module.

The receiving module is configured to receive position range information of multiple preset input regions sent by an application chip.

The assignment module is configured to assign each of the preset input regions with corresponding preset data, and establish an association relationship between the preset input regions and the corresponding preset data to obtain a preset data query table;

The query module is configured to determine, when target information sent by the application chip is received, target data corresponding to the target information based on the preset data query table.

The second sending module is configured to send the target data to the application chip.

In accordance with a fifth aspect, an embodiment of the present application provides a dual-chip point-of-sale terminal, which includes a security chip, an application chip, and a computer program stored in and executable on the security chip and the application chip, wherein the application chip is configured to, when executing the computer program, implement the data input method described in the first aspect, and the security chip is configured to, when executing the computer program, implement the data input method described in the second aspect.

In accordance with a sixth aspect, an embodiment of the present application provides a computer-readable storage medium, in the computer-readable storage medium, a computer program is stored. The computer program, when executed by a processor, enables the data input method described in the first aspect to be implemented.

In accordance with a seventh aspect, an embodiment of the present application provides a computer program product, which, when executed on a terminal device, enables the terminal device to implement the data input method described in the first aspect.

Compared with the existing technologies, the embodiment in accordance with the first aspect of the present application has the following beneficial effects: the touch data detected based on the touch screen is filtered by means of the application chip, and only the detected target information is sent to the security chip for processing, thereby the calculation amount of the security chip is reduced, and a multi-touch signal of the touch screen is processed by means of the security chip based on the software logic to determine the input data of the visually impaired user, thus, the efficiency and accuracy of data input are improved.

It can be understood that, for beneficial effects of the second to seventh aspects mentioned above, references may be made to the relevant description in the first aspect mentioned above, which will not be repeated here.

BRIEF DESCRIPTION OF DRAWINGS

In order to illustrate the technical schemes in the embodiments of the present application more clearly, the drawings that need to be used in the description of the embodiments will be briefly introduced below. Obviously, the drawings in the following description are merely some embodiments of the present application. For persons of ordinary skills in the art, other drawings may be obtained based on these drawings without exerting creative efforts.

FIG. 1 is a flow chart of a data input method provided in an embodiment according to a first aspect of the present application;

FIG. 2 is a schematic diagram of a data input area provided in an embodiment according to the first aspect of the present application;

DETAILED DESCRIPTION OF EMBODIMENTS

Figure 3:
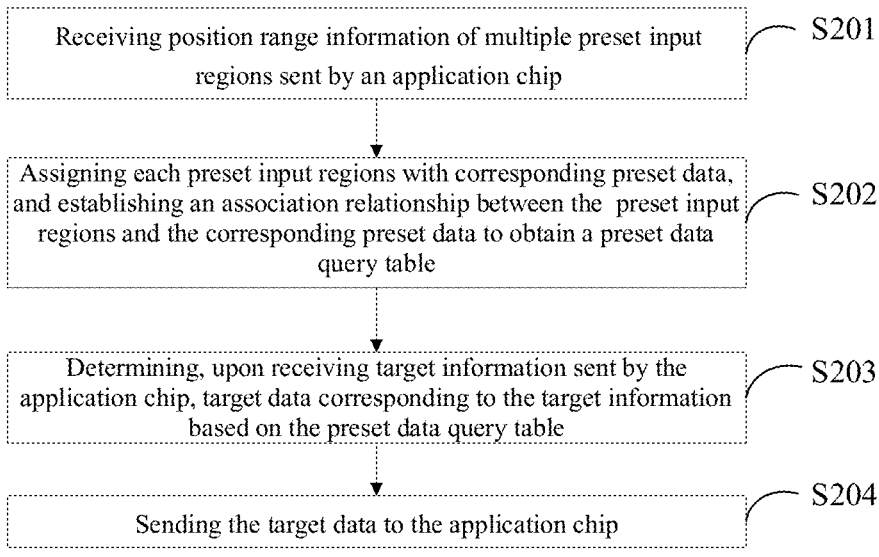
FIG. 3 is a flow chart of a data input method provided in an embodiment according to a second aspect of the present application.

In the following description, for the purpose of explanation rather than limitation, specific details such as particular system structures and technologies are proposed to provide a thorough understanding of the embodiments of the present application. However, it will be apparent to persons of ordinary skills in the art that the present application may be practiced in other embodiments without these specific details. In other instances, detailed descriptions of well-known systems, devices, circuits, and methods are omitted so as not to obscure the description of the present application with unnecessary details.

It should be understood that, when used in this specification and the appended claims, the term "including/comprising" indicates the presence of the described features, integers, steps, operations, elements and/or components but does not exclude the presence or addition of one or more other features, integers, steps, operations, elements, components and/or any combination thereof.

It should also be understood that the term "and/or" used in this specification and the appended claims refers to any combination of one or more of the associated listed items and all possible combinations, and includes these combinations.

As used in this specification and the appended claims, the term "if" may be interpreted as "when" or "once" or "in response to a determination" or "in response to a detection" depending on the context. Similarly, the phrase "if determined" or "if [described condition or event] is detected" may be interpreted as meaning "once determined" or "in response to determining" or "once [the described condition or event] is detected" or "in response to detecting [the described condition or event]" depending on the context.

In addition, in the description of this specification and the appended claims, the terms "first", "second", "third", etc. are only used to distinguish the description and cannot be understood as indicating or implying relative importance.

The reference to "one embodiment" or "some embodiments" or the like described in this specification means that a particular feature, structure or characteristic described in connection with the embodiment is included in one or more embodiments of the present application. Therefore, the statements "in one embodiment," "in some embodiments," "in other embodiments," "in further embodiments", etc. appearing in different places in this specification do not necessarily all refer to the same embodiment, but rather to "one or more but not all embodiments", unless specifically stated otherwise. The terms "including," "includes," "having," and variations thereof all mean "including but not limited to" unless otherwise specifically emphasized.

The data input method provided in the embodiment of the present application may be applied to a terminal device such as a dual-chip point-of-sale (Point Of Sale, POS) terminal, etc., and the embodiment of the present application does not impose any restrictions on the specific type of terminal device.

FIG. 1 shows a schematic flow chart of a data input method provided by the present application. As an example but not a limitation, the method may be applied to the above mentioned application chip (Application Processor, AP).

In S101, a secure input mode is entered upon detecting a preset touch event.

Particularly, when it is detected that a preset touch event is triggered by a user on a touch screen of the point-of-sale terminal, then it is determined that the user is performing a password input operation at this time, and the secure input mode is entered. Herein, the secure input mode refers to that the detected target information is sent to a security chip, and by means of the security chip, the target information is processed to determine a data input mode of the corresponding password information.

In S102, target information of a preset double-click event is obtained upon detecting a preset double-click event within a preset time period.

Particularly, within the preset time period, the starting moment of which is the occurrence time of the preset touch event, and the length of which is a first preset duration, each time the preset double-click event is triggered by the user on the touch screen, the corresponding target information is obtained, and the target information of all preset double-click events detected within the above-mentioned preset time period are obtained. Herein, the preset time period refers to a time period starting from the occurrence time of the preset touch event and having a time length of the first preset duration. The first preset duration may be specified according to actual conditions.

For example, a first preset duration is set to 8 seconds, the occurrence time of the preset touch event is 10:00 05, and the corresponding preset time period refers to the time period from 10:00 05 to 10:00 13.

It can be understood that no processing will be performed to the information corresponding to a single-click event detected within the above preset time period, or the information corresponding to the preset double-click event occurring at a time beyond the above preset time period. By means of filtering, the target information of all preset double-click events within the preset time period are obtained, this can reduce the probability of sending invalid maloperation information (such as the single-click event, or the information of preset double-click events occurring at the time beyond the preset time period) to the security chip, thereby the calculation amount of the security chip is reduced and the efficiency of data input is improved.

In S103, the target information is sent to a security chip, and target data corresponding to the target information returned by the security chip is received.

Particularly, the target information of all preset double-click events within the preset time period obtained by means of filtering are sent to the security chip, and the target data based on the target information returned by the security chip is received. By means of input information processing within the security chip, the security of data input can be improved.

In S104, the target data is uploaded to an application layer upon detecting that an input is completed.

Particularly, when it is detected that the data input is completed, the target data is uploaded to the application layer and the secure input mode is exited. In the meantime, a first preset prompt sound (such as "ding dong") is issued to prompt that the password has been uploaded.

As an example rather than a limitation, an identification of the completion of data input includes but is not limited to that: a preset number of target data (which may be specifically set according to actual conditions, for example, the preset number of passwords has 6 digits) is received, and another target data indicating the completion of input is received.

As an example rather than a limitation, in case that the target data indicating the completion of input is detected while the number of target data obtained is insufficient (for example, the set password includes 6 digits, and the received target data only includes 5 digits), then a sixth preset prompt sound (such as "Chuu--") may be issued to prompt the user that the number of passwords is insufficient.

In one embodiment, before the step of entering the secure input mode upon detecting the preset touch event, the method also includes the following steps:

dividing a keyboard area into a data input area and a non-input area;

dividing the data input area into multiple preset input regions; and determining position range information of each preset input region, and sending the position range information of each preset input region to the security chip.

Particularly, the keyboard is divided into the data input area and the non-input area (which is particularly an area other than the numeric keys such as 0-10 and the function keys such as delete, clear, and complete keys) based on actual needs in advance, and the data input area is divided into multiple preset input regions (the number of preset input regions may be specifically set according to actual needs, in this embodiment, the data input area is set to include 12 preset input regions, including ten numeric keys from 0 to 9, a complete key, and a delete key), and the position range information of each preset input region on the above data input area is determined, and the position range information of each preset input region is sent to the security chip.

In one embodiment, the step of entering the secure input mode upon detecting the preset touch event includes steps of:

obtaining first position information of the touch event when a touch event is detected and the touch event is a moving event;

determining an occurrence time and an end time of the touch event when the first position information is detected to be located in the data input area;

determining a touch duration according to the occurrence time and the end time; and determining the touch event to be the preset touch event and entering the secure input mode when it is detected that the touch duration is greater than or equal to a preset touch duration.

Particularly, it is detected whether the touch event is a moving event when the touch event is triggered by a user through the touch screen. In case that the touch event is detected to be a moving event, then the first position information of the touch event is obtained (the first position information refers to the position information of the touch event from the occurrence time to the end time). In case that the first position information is detected to be located in the data input area, then the occurrence time and end time of the touch event are determined, and the touch duration of the touch event is determined according to the occurrence time and end time of the touch event. In case that the touch duration is detected to be greater than or equal to the preset touch duration, it is determined that the user is performing a password input operation, that is, the touch event is a preset touch event, and the secure input mode is entered.

It can be understood that the user's password input operation is determined to be interrupted and the secure input mode is exited immediately once it is detected that the first position information is not in the data input area within the preset time period of the preset touch event, and a second preset prompt sound (such as "dee dee dee") is issued to prompt the user that the password input operation is interrupted and the secure input mode has been exited.

It can be understood that the touch event includes a pressing, a releasing and a moving. multiple position information will be generated accordingly when the moving event is triggered by the user. To ensure that the user can enter the password correctly, it is required to obtain the position information of the touch event from the occurrence time to the end time to ensure that the user is always in the data input area during a moving process on the touch screen.

As an example rather than a limitation, the step of detecting whether the touch event is a moving event includes that the touch event is determined to be a moving event when it is detected that the touch event is a pressing event and a displacement generated within a second preset duration starting from the occurrence time of the touch event is greater than or equal to a preset displacement. Herein, the second preset duration refers to the minimum triggering time length of the moving event. The second preset duration and the preset displacement may be specifically set according to actual needs. For example, the second preset duration is set to be 20 ms, and the preset displacement is 50 pixels. Then, the touch event is determined to be a moving event in case that the touch event is detected as a pressing event and a displacement greater than or equal to 50 pixels is generated within 20 ms starting from the occurrence time of the touch event.

Herein, the first preset duration refers to the shortest touch duration of the password input operation set in advance. In actual operation, a situation where the moving event is triggered mistakenly by the user may be occurred. Correspondingly, the user's touch operation belongs to the password input operation when the duration of the touch event is detected to be greater than or equal to the first preset duration. The user's touch operation is determined to be a maloperation when the duration of the touch event is detected to be less than the first preset duration.

For example, when a touch event is detected, it is firstly detected whether a displacement greater than or equal to the preset displacement is generated within the second preset duration starting from the occurrence time of the touch event; if the displacement generated within the second preset duration starting from the occurrence time of the touch event is greater than or equal to the preset displacement, then it is indicated that the current touch event is a moving event. The position information (i.e., the first position information) of the touch event from the occurrence time to the end time is obtained, and when it is detected that the first position information is always located in the data input area, and the touch duration of the touch event from the occurrence time to the end time is greater than or equal to the first preset duration, then it is determined that the touch event is the preset touch event, and the user is performing the password input operation.

As an example rather than a limitation, each keyboard includes four corners, and the user is enabled to determine his/her sliding position through the four corners of the keyboard. Correspondingly, when it is detected that the user's first position information is located at a corner of the keyboard, a third preset prompt sound (such as "dee--") may be issued to remind the user that he has slid to the edge of the keyboard to avoid sliding out of the keyboard area. When the user's first position information is detected to be located at the boundary of the data input area, a fourth preset prompt sound (such as "toot--") is issued to remind the user that he has slid to the edge of the data input area to avoid triggering other erroneous operations.

In one embodiment, the step of obtaining the target information of the preset double-click event upon detecting the preset double-click event within the preset time period includes steps of:

obtaining second position information of the double-click event each time the double-click event is detected within the preset time period;

determining the double-click event to be the preset double-click event, and taking the second position information as the target information when the second position information is detected to be located in the data input area; and obtaining all of the target information of preset double-click events detected within the preset time period.

Particularly, within the first preset duration (i.e., the preset time period) from the moment the preset touch event is triggered by the user through the touch screen, each time the double-click event is simultaneously triggered by the user through the touch screen, the second position information of the double-click event is obtained, and when the second position information is detected to be located in the data input area, the double-click event is determined to be a preset double-click event (i.e., a password information is entered by the user by double-clicking the data input area in the touch screen), and the second position is taken as the target information, in this way, the target information corresponding to all preset double-click events detected within the first preset duration from the moment the preset touch event triggered by the user through the touch screen are obtained.

As an example rather than a limitation, a double-click event refers to two click events for the same position information occurring within a preset time interval.

In one embodiment, after the step of entering the secure input mode when the preset touch event is detected, the method also includes a step of:

exiting the secure input mode when no preset double-click event is detected within the preset time period.

Particularly, within the first preset duration (i.e., the preset time period) from the moment the preset touch event is triggered by the user through the touch screen, a first prompt information is generated and uploaded to the application layer if no preset double-click event is detected. Herein, the first prompt information may be specifically set according to actual needs. For example, the first prompt information includes sending a notification of "no password information being detected" to the application layer, and in the meantime, issuing a second preset prompt sound (such as "dee dee dee") to prompt the user that the password input operation is interrupted and the security input mode has been exited.

It can be understood that each time a preset touch event triggered by the user is detected, a fifth preset prompt sound (such as "beep--") may be issued to prompt the user that one piece of password information is entered.

FIG. 2 exemplarily shows a schematic diagram of a data input area.

In FIG. 2, the data input area includes 12 preset input regions, and the corresponding preset data includes numbers 0-9, an "X" function key, and an "OK" function key. The coordinate information is compared with the position information range of each preset input region. If it is detected that the coordinate information is within the coordinate information range of a preset input region, then this preset region may be taken as the target preset input region, and then the preset data associated with the target preset input region is taken as the target data. Herein, in case that the preset double-click event in the preset region corresponding to the "X" function key is triggered by the user through the touch screen, then the target information of the preset double-click event is sent to the security chip, and the target data "delete" returned by the security chip is received, indicating that the previous target data (that is, the target data determined by the previous preset double-click event) needs to be deleted. Herein, in case that the preset double-click event in the preset region corresponding to the "OK" function key is triggered by the user through the touch screen, then the target information of the preset double-click event is sent to the security chip, and the target data "completed" returned by the security chip is received, indicating that the user has completed the password input operation. At this time, if the number of target data detected reaches the preset number, then all received target data may be uploaded to the application layer and the security input mode is exited.

For example, the password the user needs to enter is "472". To enter 472, the user may start from the upper left corner of the keyboard to trigger the preset touch event by putting any finger on the touch screen and sliding downward without releasing the finger until hearing the first "beep" indicating that the key region of number 1 has been found, then, the finger is slid on the touch screen in the order of 1-4 to find the corresponding key region of number 4 and then released, instead, a double-clicking is performed on the touch screen in the key region of number 4 to trigger the preset double-click event, the position information of the number 4 key region is sent to the security chip, and the target data "4" returned by the security chip is received. Then, the figure is slid in the order of 4-8-7 to find the key region of number 7 and then released, instead, a double-clicking is performed on the touch screen in the number 7 key region to trigger the preset double-click event, the position information of the number 7 key region is sent to the security chip, and the target data "7" returned by the security chip is received. By analogy, the target data "2" returned by the security chip is received. After that, the user's finger is slid to find the region of "OK" key and then released, instead, a double-clicking is performed on the touch screen in the "OK" key region to trigger the preset double-click event, the position information of the "OK" key region is sent to the security chip, and the target data returned by the security chip as "completed" information is received, hereby the password input operation is completed.

In this embodiment, the touch data detected based on the touch screen is filtered by means of the application chip, and only the detected target information is sent to the security chip for processing, thereby the calculation amount of the security chip is reduced, and a multi-touch signal of the touch screen is processed by means of the security chip based on the software logic to determine the input data of the visually impaired user, thus, the efficiency and accuracy of data input are improved.

FIG. 3 shows another schematic flow chart of a data input method provided by the present application. As an example but not a limitation, the method may be applied to a security processor (Security Processor, SP).

In S201, position range information of multiple preset input regions sent by an application chip are received.

Particularly, the position range information of multiple preset input regions sent by the application chip are received, where the position range information of a preset input region is particularly the relative position coordinates of the preset input region and the data input area.

In S202, each of the preset input regions is assigned with corresponding preset data, and an association relationship between the preset input regions and the corresponding preset data is established to obtain a preset data query table.

Particularly, each preset input region is assigned with one preset data, and the association relationship between each preset input region and the corresponding preset data is established to obtain the preset data query table.

In S203, target data corresponding to target information is determined based on the preset data query table when the target information sent by the application chip is received.

In S204, the target data is sent to the application chip.

Particularly, when the target information of the preset double-click event within the preset time period sent by the application chip is received, the target data corresponding to the target information is found by looking up in the preset data query table, and the target data is sent to the application chip.

In one embodiment, the target information includes coordinate information;

The step of determining the target data corresponding to the target information based on the preset data query table when the target information sent by the application chip is received includes steps of:

determining a target preset input region corresponding to the coordinate information according to the position range information of the multiple preset input regions when the coordinate information sent by the application chip is received; and looking up in the preset data query table to find preset data associated with the target preset input region as the target data.

Particularly, when the coordinate information (that is, the second position information of the preset double-click event described in the first embodiment) sent by the application chip is received, the target preset input region where the preset double-click event is located is determined according to the above coordinate information (Particularly, the above coordinate information is compared with the position information range of each preset input region, and if it is detected that the coordinate information is within the coordinate information range of a preset input region, then this preset region is taken as the target preset input region), and the preset data associated with the above target preset input region found by looking up the preset data query table is taken as the target data, and stored. Herein, the preset data query table is configured to store multiple preset data and preset input regions associated with the multiple preset data.

In this embodiment, the touch data detected based on the touch screen is filtered by means of the application chip, and only the detected target information is sent to the security chip for processing, thereby the calculation amount of the security chip is reduced, and a multi-touch signal of the touch screen is processed by means of the security chip based on the software logic to determine the input data of the visually impaired user, thus, the efficiency and accuracy of data input are improved.

It should be understood that the sequence number of each step in the above embodiment does not mean the order of execution. The execution order of each process should be determined by its function and internal logic, and should not constitute any limitation on the implementation process of the embodiment of the present application.

Figure 4:
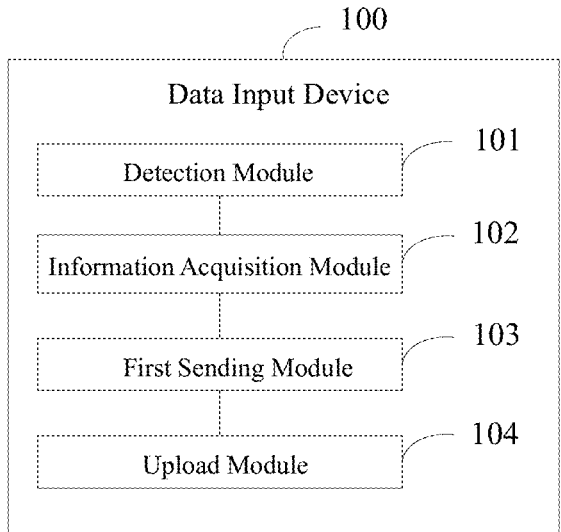
FIG. 4 is a structural diagram of a data input device provided in an embodiment according to a third aspect of the present application.

Corresponding to the data input method described in the embodiment according to the first aspect, FIG. 4 shows a structural block diagram of a data input device provided in an embodiment of the present application, and the data input device is applied to the application chip. For the convenience of explanation, only the part related to the embodiment of the present application is shown.

Referring to FIG. 4, the data input device 100 includes: a detection module 101, an information acquisition module 102, a first sending module 103 and an upload module 104.

The detection module 101 is configured to enter a secure input mode when a preset touch event is detected.

The information acquisition module 102 is configured to obtain target information of a preset double-click event when the preset double-click event is detected within a preset time period.

The first sending module 103 is configured to send the target information to a security chip, and receive target data corresponding to the target information returned by the security chip.

The upload module 104 is configured to upload the target data to an application layer when an input is detected to be completed.

In one embodiment, the device also includes: a first area division module, a second area division module and a position information determination module.

The first area division module is configured to divide the keyboard area into a data input area and a non-input area.

The second area division module is configured to divide the data input area into multiple preset input regions.

The position information determination module is configured to determine position range information of each preset input region, and send the position range information of each preset input region to the security chip.

In one embodiment, the detection module includes: a first detection unit, a second detection unit, a duration determination unit and a third detection unit.

The first detection unit is configured to obtain first position information of a touch event when the touch event is detected and the touch event is a moving event.

The second detection unit is configured to determine an occurrence time and an end time of the touch event when the first position information is detected to be located in the data input area.

The duration determination unit is configured to determine a touch duration according to the occurrence time and the end time.

The third detection unit is configured to determine the touch event as a preset touch event and enter the secure input mode when the touch duration is detected to be greater than or equal to a preset touch duration.

In one embodiment, the information acquisition module includes: an information acquisition unit, a fourth detection unit and a fifth detection unit.

The information acquisition unit is configured to obtain second position information of the double-click event each time a double-click event is detected within the preset time period.

The fourth detection unit is configured to determine the double-click event as a preset double-click event when the second position information is detected to be located in the data input area, and take the second position information as the target information.

The fifth detection unit is configured to obtain all of the target information detected within the preset time period.

In one embodiment, the device also includes an exit module.

The exit module is configured to exit the secure input mode when the preset double-click event is not detected within the preset time period.

In this embodiment, the touch data detected based on the touch screen is filtered by means of the application chip, and only the detected target information is sent to the security chip for processing, thereby the calculation amount of the security chip is reduced, and a multi-touch signal of the touch screen is processed by means of the security chip based on the software logic to determine the input data of the visually impaired user, thus, the efficiency and accuracy of data input are improved.

Figure 5:
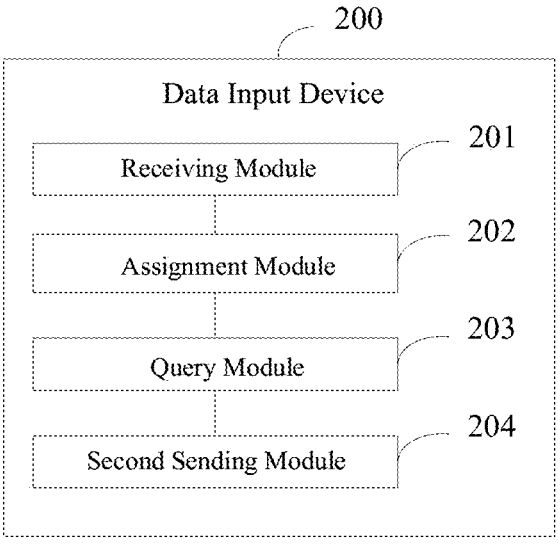
FIG. 5 is a structural diagram of a data input device provided in an embodiment according to a fourth aspect of the present application.

Corresponding to the data input method described in the embodiment according to the second aspect, FIG. 5 shows a structural block diagram of a data input device provided by the embodiment of the present application, and the data input device is applied to a security chip. For the convenience of explanation, only the part related to the embodiment of the present application is shown.

Referring to FIG. 5, the data input device 200 includes: a receiving module 201, an assignment module 202, a query module 203 and a second sending module 204.

The receiving module 201 is configured to receive position range information of multiple preset input regions sent by an application chip.

The assignment module 202 is configured to assign each of the preset input regions with corresponding preset data, and establish an association relationship between the preset input regions and the corresponding preset data to obtain a preset data query table.

The query module 203 is configured to determine target data corresponding to target information based on the preset data query table when the target information sent by the application chip is received.

The second sending module 204 is configured to send the target data to the application chip.

In one embodiment, the target information includes coordinate information.

The query module includes a determination unit and a look-up unit.

The determination unit is configured to determine a target preset input region corresponding to coordinate information according to the position range information of the multiple preset input regions when the coordinate information sent by the application chip is received.

The look-up unit is configured to look up in the preset data query table to find preset data associated with the target preset input region, and take the preset data as target data.

In this embodiment, the touch data detected based on the touch screen is filtered by means of the application chip, and only the detected target information is sent to the security chip for processing, thereby the calculation amount of the security chip is reduced, and a multi-touch signal of the touch screen is processed by means of the security chip based on the software logic to determine the input data of the visually impaired user, thus, the efficiency and accuracy of data input are improved.

It should be noted that the information interaction, execution process, etc., between the above-mentioned devices/units are based on the same concept as the method embodiments of the present application. For specific functions and technical effects of these embodiments, references may be particularly made to the method embodiments, which will not be repeated here.

Figure 6:
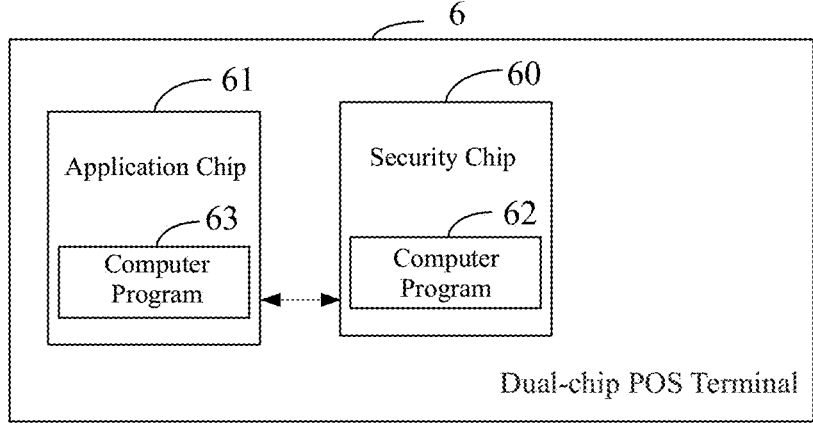
FIG. 6 is a structural diagram of a dual-chip point-of-sale terminal provided in an embodiment according to a fifth aspect of the present application.

FIG. 6 is a structural schematic diagram of a dual-chip point-of-sale terminal (Point Of Sale, POS) provided in an embodiment of the present application. As shown in FIG. 6, the dual-chip POS terminal 6 of this embodiment includes: a security chip 60, an application chip 61, a computer program 62 stored in and executable by the security chip 60, and a computer program 63 stored in and executable by the application chip 61. The application chip 61, when executing the computer program 63, is configured to implement the steps of the data input method in the embodiment according to the first aspect. The security chip 60, when executing the computer program 62, is configured to implement the steps of the data input method in the embodiment according to the second aspect.

The dual-chip POS terminal 6 may be a point-of-sale terminal or other equipment. The dual-chip POS terminal may include, but is not limited to, a security chip 60 and an application chip 61. It can be understood for persons of ordinary skills in the art that FIG. 6 is only an example of the dual-chip POS terminal 6, which does not constitute a limitation on the dual-chip POS terminal 6. The equipment may include more or less components than shown in the figure, or may include a combination of certain components, or different components, for example, the equipment may also include input and output devices, network access devices, etc.

The above-mentioned security chip 60 may be a security processor (Security Processor, SP); the above-mentioned application chip 61 may be an application processor (Application Processor, AP).

It can be clearly understood for persons of ordinary skills in the art that, for the convenience and simplicity of description, only the division of the above-mentioned functional units and modules is discussed as an example. In practical applications, the above-mentioned function may be allocated to different functional units and modules according to actual needs, that is, the internal structure of the device may be divided into different functional units or modules to complete all or part of the functions described above. The functional units and modules in the embodiment may be integrated into a processing unit, or each unit may exist physically separately, or two or more units may be integrated into one unit. The above-mentioned integrated unit may be implemented in the form of hardware or in the form of software functional units. In addition, the specific names of the functional units and modules are only for the convenience of distinguishing these units or modules from each other and are not intended to limit the protection scope of the present application. The specific working process of the units and modules in the above-mentioned system may refer to the corresponding process in the above-mentioned method embodiment, which will not be repeated here.

An embodiment of the present application also provides a computer-readable storage medium, in the computer-readable storage medium, a computer program is store. The computer program, when executed by a processor, may cause the steps in any of the above-mentioned method embodiments to be implemented.

An embodiment of the present application provides a computer program product. The computer program product, when executed on a mobile terminal, enables the mobile terminal to implement the steps in any of the above-mentioned method embodiments.

The integrated unit, if implemented in the form of a software functional unit and sold or used as an independent product, may be stored in a computer-readable storage medium. Based on this understanding, all or part of the processes in the above-mentioned embodiment method implemented in the present application may be enabled by instructing the relevant hardware through a computer program. The computer program may be stored in a computer-readable storage medium. The computer program, when executed by the processor, enables the steps of the above-mentioned method embodiments to be implemented. Herein, the computer program includes computer program code, which may be in the form of source code, the form of object code form, an executable file or some intermediate form. The computer-readable medium may at least include: any entity or device that can carry the computer program code to a camera/terminal device, a recording medium, a computer memory, a read-only memory (ROM), a random-access memory (RAM), an electric carrier signal, a telecommunication signal and a software distribution medium. For example, USB flash drive, a mobile hard disk, a disk or optical disk. In some jurisdictions, according to legislation and patent practice, the computer-readable medium cannot be the electric carrier signal or the telecommunication signal.

In the above embodiments, the description of each embodiment has its own emphasis. For parts that are not described or recorded in a certain embodiment, references may be made to the relevant description of other embodiments.

A person of ordinary skill in the art can realize that the units and algorithm steps of each example described in the embodiments disclosed in this article may be implemented in electronic hardware, or a combination of computer software and electronic hardware. Whether these functions are executed in hardware or software depends on the specific application and design constraints of the technical solution.

Professional technicians may use different methods to implement the described functions for each specific application, but such implementation should not be considered to be beyond the scope of the present application.

In the embodiments provided in the present application, it should be understood that the disclosed device/network equipment and method may be implemented in other ways. For example, the device/network equipment embodiments described above are only schematic. For example, the division of the modules or units is only a logical function division. Other division methods may be possible in actual implementations, such as multiple units or components may be combined or integrated into another system, or some features may be ignored or not executed. Another point is that the mutual coupling or direct coupling or communication connection shown or discussed may be indirect coupling or communication connection of devices or units through some interfaces, which may be connected in electrical, mechanical or other forms.

The units described as separate components may or may not be physically separated, and the components displayed as units may or may not be physical units, that is, they may be located in one place or distributed on multiple network units. Some or all of the units may be selected according to actual needs to achieve the purpose of the scheme of this embodiment.

The above embodiments are only used to illustrate rather than limiting the technical schemes of the present application. Although the present application has been described in detail with reference to the foregoing embodiments, it should be understood by persons of ordinary skills in the art that the technical schemes described in the foregoing embodiments may still be modified, or some of the technical features in the foregoing embodiments may be equivalently substituted. These modifications or substitutions do not cause the essence of the corresponding technical schemes to deviate from the spirit and scope of the technical schemes of various embodiments of the present application, and thus shall all be included within the protection scope of the present application.

The invention claimed is:

1. A data input method, applied to an application chip, and comprising:

entering, upon detecting a preset touch event, a secure input mode;

obtaining, upon detecting a preset double-click event within a preset time period, target information of the preset double-click event;

sending the target information to a security chip, and receiving target data corresponding to the target information returned by the security chip; and uploading, upon detecting that an input is completed, the target data to an application layer;

wherein the secure input mode refers to a situation where the target information obtained by the application chip is sent to the security chip and processed by the security chip, to determine a data input mode of corresponding password information, wherein said entering, upon detecting the preset touch event, the secure input mode comprises:

obtaining, upon detecting a touch event and the touch event is a moving event, first position information of the touch event;

determining an occurrence time and an end time of the touch event when the first position information is detected to be located in a data input area;

determining a touch duration according to the occurrence time and the end time; and determining the touch event to be the preset touch event when the touch duration is detected to be greater than or equal to a preset touch duration and entering the secure input mode, wherein said obtaining, upon detecting the preset double-click event within the preset time period, the target information of the preset double-click event, comprises:

obtaining, each time a double-click event is detected within the preset time period, second position information of the double-click event;

determining the double-click event to be the preset double-click event when the second position information is detected to be located in the data input area and taking the second position information as the target information; and obtaining all of the target information detected within the preset time period.

2. The data input method according to claim 1, wherein, before said entering, upon detecting the preset touch event, the secure input mode, the data input method further comprises:

dividing the keyboard area into a data input area and a non-input area;

dividing the data input area into multiple preset input regions; and determining position range information of each of the multiple preset input regions, and sending the position range information of each of the multiple preset input regions to the security chip.

3. A data input method according to claim 1, wherein after said entering, upon detecting the preset touch event, the secure input mode, the data input method further comprises:

exiting the secure input mode when the preset double-click event is not detected within the preset time period.

4. A dual-chip point-of-sale terminal, comprising a security chip, an application chip, and a computer program stored in and executable on the security chip and the application chip, wherein the application chip, when executing the computer program, is configured to implement operations that comprise:

entering, upon detecting a preset touch event, a secure input mode;

obtaining, upon detecting a preset double-click event within a preset time period, target information of the preset double-click event;

sending the target information to the security chip, and receiving target data corresponding to the target information returned by the security chip; and uploading, upon detecting that an input is completed, the target data to an application layer;

wherein the secure input mode refers to a situation where the target information obtained by the application chip is sent to the security chip and processed by the security chip, to determine a data input mode of corresponding password information;

wherein said entering, upon detecting the preset touch event, the secure input mode comprises:

obtaining, upon detecting a touch event and the touch event is a moving event, first position information of the touch event;

determining an occurrence time and an end time of the touch event when the first position information is detected to be located in a data input area;

determining a touch duration according to the occurrence time and the end time; and determining the touch event to be the preset touch event when the touch duration is detected to be greater than or equal to a preset touch duration and entering the secure input mode;

wherein said obtaining, upon detecting the preset double-click event within the preset time period, the target information of the preset double-click event, comprises:

obtaining, each time a double-click event is detected within the preset time period, second position information of the double-click event;

determining the double-click event to be the preset double-click event when the second position information is detected to be located in the data input area and taking the second position information as the target information; and obtaining all of the target information detected within the preset time period; and wherein the security chip, when executing the computer program, is configured to implement operations that comprise:

receiving position range information of multiple preset input regions of the data input area sent by the application chip;

assigning each of the multiple preset input regions with corresponding preset data, and establishing an association relationship between the multiple preset input regions and the corresponding preset data to obtain a preset data query table;

determining, upon receiving the target information sent by the application chip, the target data corresponding to the target information based on the preset data query table; and sending the target data to the application chip.

5. The dual-chip point-of-sale terminal according to claim 4, wherein, before the operation of entering, upon detecting the preset touch event, the secure input mode, the operations performed by the application chip further comprise:

dividing a keyboard area into the data input area and a non-input area;

dividing the data input area into the multiple preset input regions; and determining the position range information of each of the multiple preset input regions, and sending the position range information of each of the multiple preset input regions to the security chip.

6. The dual-chip point-of-sale terminal according to claim 4, wherein after the operation of entering, upon detecting the preset touch event, the secure input mode, the operations performed by the application chip further comprises:

exiting the secure input mode when the preset double-click event is not detected within the preset time period.

7. The dual-chip point-of-sale terminal according to claim 4, wherein the target information includes coordinate information;

the operation of determining, upon receiving the target information sent by the application chip, the target data corresponding to the target information based on the preset data query table comprises:

determining, upon receiving the coordinate information sent by the application chip, a target preset input region corresponding to the coordinate information according to the position range information of the multiple preset input regions; and looking up in the preset data query table, to find preset data associated with the target preset input region as the target data.

8. The dual-chip point-of-sale terminal according to claim 4, wherein the corresponding preset data assigned to the multiple preset input regions comprises numbers 0-9, an "X" function key, and an "OK" function key.

* * * * *